May 26, 1925.  
E. L. HAMILTON  
TEA SERVICE TRAY  
Filed Sept. 27, 1923
1,539,668
2 Sheets-Sheet 1
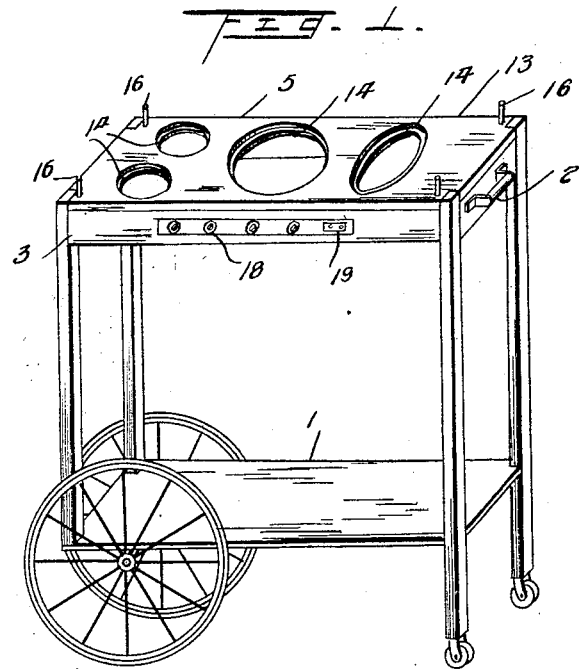
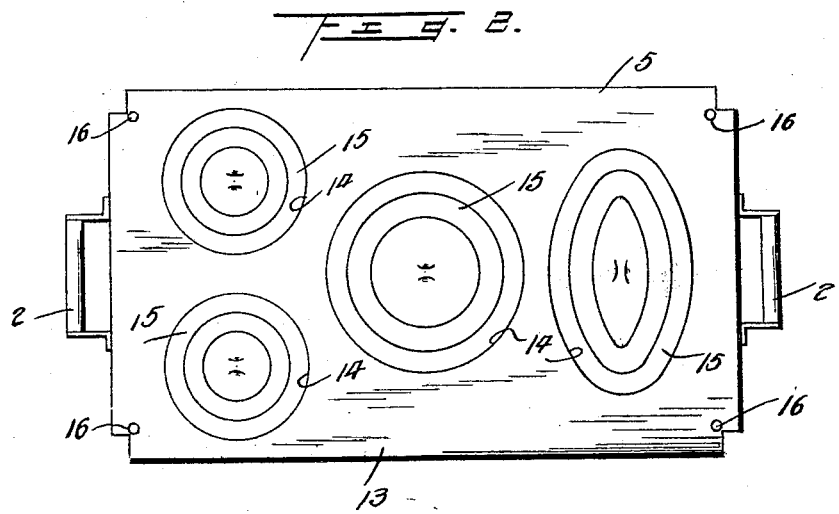
Inventor  
E. L. Hamilton.  
By  
Attorney

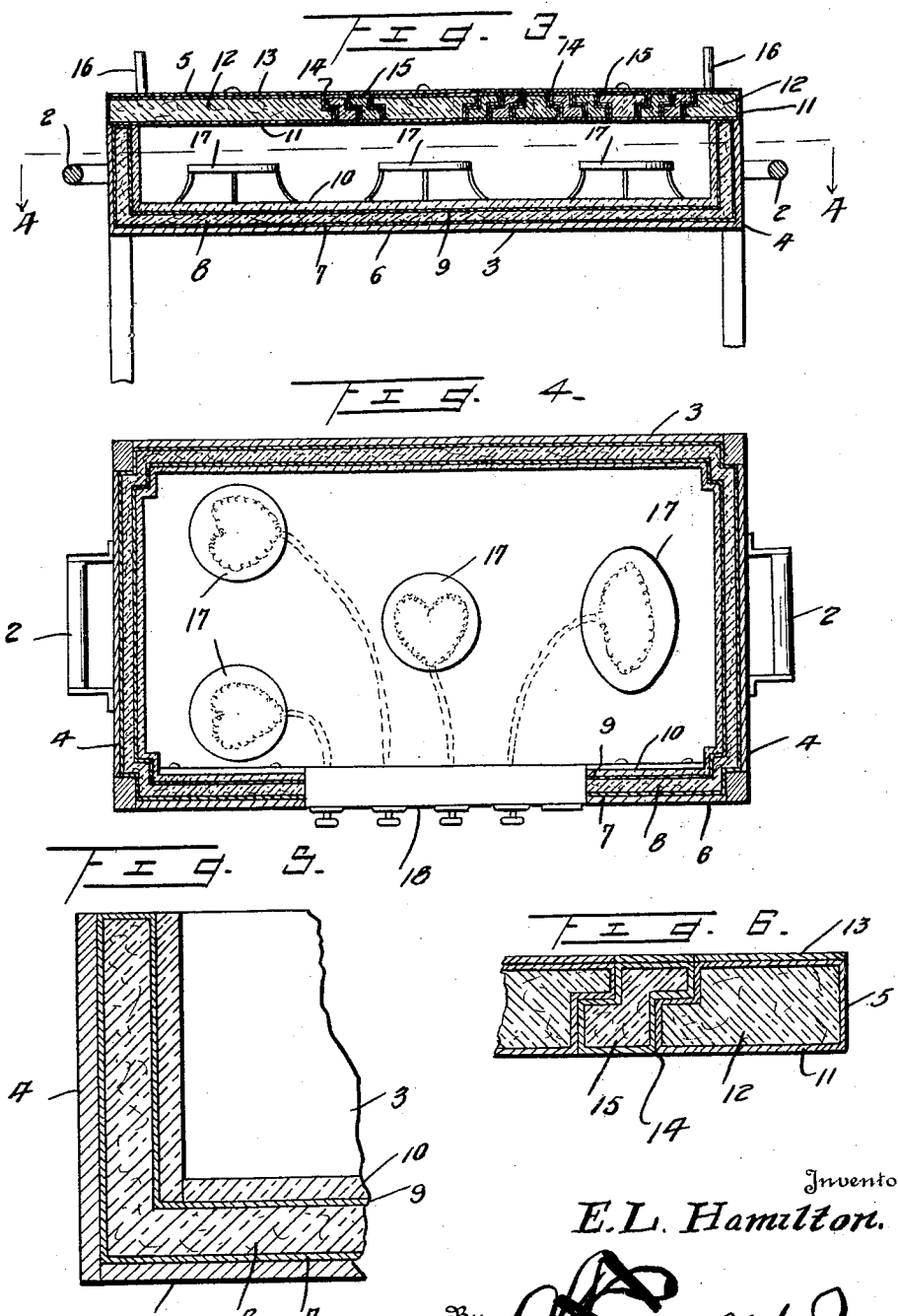

Patented May 26, 1925.

1,539,668

UNITED STATES PATENT OFFICE.

EDWARD L. HAMILTON, OF LONG BEACH, CALIFORNIA.

TEA-SERVICE TRAY.

Application filed September 27, 1923. Serial No. 665,207.

*To all whom it may concern:*

Be it known that I, EDWARD L. HAMILTON, a citizen of the United States, residing at Long Beach, in the county of Los Angeles and State of California, have invented certain new and useful Improvements in Tea-Service Trays; and I do hereby declare the following to be a full, clear, and exact description of the invention, such as will enable others skilled in the art to which it appertains to make and use the same.

The object of the present invention is the provision of a tray for serving food and keeping the same hot, said tray being electrically heated and adapted to accommodate different sizes and shapes of dishes and constructed for use in connection with a tea wagon or independently thereof, as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a tray embodying the invention, showing the same mounted upon a tea wagon.

Figure 2 is a top plan view of the tray disassociated from the tea wagon,

Figure 3 is a sectional view of the tray and a portion of the tea wagon,

Figure 4 is a horizontal section on the line 4—4 of Figure 3,

Figure 5 is an enlarged detail section of a portion of the tray, and

Figure 6 is a similar view of a portion of the top of the tray.

Corresponding and like parts are referred to in the following description and designated in the several views of the drawings by like reference characters.

The numeral 1 designates a tea wagon such as generally provided for serving food and like refreshment. The tray forming the subject matter of the present invention is shown associated with the tea wagon as convenient means for transporting the food, although it is to be understood that the tray may be used independently of the wagon, as indicated most clearly in Figure 2, and for this purpose handles 2 are provided at opposite ends of the tray.

The tray is hollow and comprises a bottom 3, enclosing walls 4 and a top 5. The bottom and enclosing walls involve a laminated structure, the outermost layer 6 being preferably of wood, the next layer 7 sheet metal, the middle layer 8 of insulating material such as asbestos or other refractory material, a layer 9 of sheet metal and an inner layer 10 of porcelain. The top 5 comprises a sheet metal casing 11 and a filling 12 of asbestos or other refractory material. A covering 13 of highly polished metal extends over the top. A plurality of openings 14 are formed in the top 5 and are of various shapes and sizes to correspond with like shaped pieces containing the food to be served. The openings 14 may be closed by rings 15 which conform to the outline thereof, whereby to admit of different sized dishes of corresponding shape being fitted to an opening so as to close the same and prevent the escape of heat. The rings 15 are constructed in a manner similar to the top and are adapted to nest, as indicated most clearly in Figure 6. Posts 16 rise from the top 5 and are adapted to support a tray or analogous article containing the food to be served, or the dishes into which the food is to be placed for serving when the heating feature of the tray is not desired.

Within the tray is disposed a plurality of heaters 7, the same being mounted upon the bottom 3 and located opposite the openings 14 in the top. The heaters 17 are preferably of the electric type and the resistant element of each is included in a circuit embodying a switch 18, whereby any required heater may be cut into circuit for heating the dish associated therewith. The numeral 19 designates a plug whereby the tray may be electrically connected with the outlet or plug of a service conductor by means of an electric cord in substantially the same manner as an electric lamp, fan or other electrically operated device.

What is claimed is:

A serving tray consisting of a hollow shallow body of considerable area provided with openings in its top for the retention of dishes, means to heat the hollow space of the tray, and widely spaced posts for an auxiliary tray rising from the top of the said body and each to the same height to dispose the auxiliary tray in spaced relation to and level with said top.

In testimony whereof I affix my signature in presence of two witnesses.

EDWARD L. HAMILTON.

Witnesses:
 EDNA G. HAWKINS,
 MARIE SPENCER.